US010804551B2

(12) United States Patent
Ogawa et al.

(10) Patent No.: US 10,804,551 B2
(45) Date of Patent: Oct. 13, 2020

(54) FUEL CELL SYSTEM AND REMAINING WATER PURGING CONTROL METHOD

(71) Applicant: TOYOTA JIDOSHA KABUSHIKI KAISHA, Toyota-shi, Aichi-ken (JP)

(72) Inventors: Tomohiro Ogawa, Miyoshi (JP); Tsuyoshi Maruo, Okazaki (JP); Shun Matsumoto, Toyota (JP); Hiroyuki Tsunekawa, Seto (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 424 days.

(21) Appl. No.: 15/899,033

(22) Filed: Feb. 19, 2018

(65) Prior Publication Data

US 2018/0277863 A1    Sep. 27, 2018

(30) Foreign Application Priority Data

Mar. 22, 2017   (JP) ................................. 2017-055222

(51) Int. Cl.
  *H01M 8/04119*   (2016.01)
  *H01M 8/04228*   (2016.01)
  (Continued)

(52) U.S. Cl.
  CPC ... *H01M 8/04179* (2013.01); *H01M 8/04228* (2016.02); *H01M 8/04253* (2013.01); *H01M 8/04303* (2016.02); *H01M 8/04365* (2013.01); *H01M 8/04373* (2013.01); *H01M 8/04641* (2013.01); *H01M 8/04686* (2013.01);
  (Continued)

(58) Field of Classification Search
  CPC .................................................. H01M 8/04179
  See application file for complete search history.

(56) References Cited

U.S. PATENT DOCUMENTS

2002/0146602 A1\* 10/2002 Abe .................. H01M 8/04402
                                                          429/429
2005/0112424 A1\* 5/2005 Hirano .............. H01M 8/04225
                                                          429/415
(Continued)

FOREIGN PATENT DOCUMENTS

| JP | 2008097841 A | 4/2008 |
| JP | 2016091885 A | 5/2016 |
| JP | 2017010908 A | 1/2017 |

*Primary Examiner* — Brian R OHara
(74) *Attorney, Agent, or Firm* — Dickinson Wright PLLC (57) ABSTRACT

A fuel cell system comprises a fuel cell; a reactive gas supply mechanism configured to supply a reactive gas to the fuel cell; a discharge flow path configured to discharge an off-gas and water discharged from the fuel cell; a valve provided in the discharge flow path; a remaining water purging controller configured to control a remaining water purging process of the fuel cell by using the reactive gas supply mechanism and the valve; a heating portion configured to heat the valve; and a failure detector configured to detect a failure of the heating portion. When a failure of the heating portion is detected, the remaining water purging controller performs the remaining water purging process and increases a water discharge power in the remaining water purging process than a water discharge power in the remaining water purging process performed when no failure of the heating portion is detected.

6 Claims, 5 Drawing Sheets

(51) Int. Cl.
*H01M 8/04303* (2016.01)
*H01M 8/04223* (2016.01)
*H01M 8/0432* (2016.01)
*H01M 8/04537* (2016.01)
*H01M 8/04664* (2016.01)
*H01M 8/04955* (2016.01)
*H01M 8/1018* (2016.01)

(52) U.S. Cl.
CPC .............. *H01M 8/04955* (2013.01); *H01M 2008/1095* (2013.01); *H01M 2250/20* (2013.01); *Y02T 90/40* (2013.01)

(56) References Cited

U.S. PATENT DOCUMENTS

| | | | |
|---|---|---|---|
| 2006/0099471 A1* | 5/2006 | Ichikawa | H01M 8/04029 429/414 |
| 2007/0141419 A1* | 6/2007 | Lee | H01M 8/04007 429/429 |
| 2011/0033763 A1* | 2/2011 | Adcock | H01M 8/04783 429/429 |
| 2011/0079455 A1* | 4/2011 | Katano | H01M 8/2485 180/65.31 |
| 2012/0171590 A1* | 7/2012 | Matsumoto | H01M 8/04388 429/442 |
| 2016/0133963 A1 | 5/2016 | Naganuma et al. | |
| 2016/0380283 A1 | 12/2016 | Yamada et al. | |

* cited by examiner

FUEL CELL SYSTEM AND REMAINING WATER PURGING CONTROL METHOD

CROSS-REFERENCE TO RELATED APPLICATIONS

The present application claims priority based on Japanese patent application No. 2017-55222 filed on Mar. 22, 2017, the disclosure of which is hereby incorporated by reference in its entirety.

BACKGROUND

Field

The present disclosure relates to a remaining water purging process for a fuel cell.

Related Art

Water generated during operation of a fuel cell and water used to humidify a reactive gas are present inside of the fuel cell. When the temperature of the fuel cell decreases to a sub-zero level after an operation stop of the fuel cell, water remaining inside of the fuel cell, for example, in pores of a catalyst layer or a gas diffusion layer included in each unit cell may be frozen to interfere with the flow of the reactive gas or an off-gas at a next operation start of the fuel cell. A fuel cell system has accordingly been proposed to perform a remaining water purging process after an operation stop of a fuel cell. A fuel cell system described in JP 2016-91885A estimates the temperature of a valve provided in a discharge flow path configured to discharge an off-gas and water at regular intervals after an operation stop of a fuel cell and performs a remaining water purging process when the estimated temperature is equal to or lower than 0° C.

The fuel cell system described in JP 2016-91885A, however, performs the remaining water purging process when the temperature of the valve provided in the discharge flow path is equal to or lower than 0° C. This makes it likely that the discharged water is frozen in the valve and interferes with opening and closing of the valve or makes it likely that the discharge flow path is blocked by ice accumulated on the valve and fails to discharge water. There is accordingly a need for a technique that reduces the amount of remaining water inside of a fuel cell, while suppressing water discharged from the fuel cell from being frozen in a valve provided in a discharge flow path.

SUMMARY

According to one aspect of the present disclosure, there is provided a fuel cell system. The fuel cell system comprises a fuel cell; a reactive gas supply mechanism configured to supply a reactive gas to the fuel cell; a discharge flow path configured to discharge an off-gas and water discharged from the fuel cell; a valve provided in the discharge flow path; a remaining water purging controller configured to control a remaining water purging process of the fuel cell by using the reactive gas supply mechanism and the valve; a heating portion configured to heat the valve; and a failure detector configured to detect a failure of the heating portion. When a failure of the heating portion is detected, the remaining water purging controller performs the remaining water purging process and increases a water discharge power in the remaining water purging process than a water discharge power in the remaining water purging process performed when no failure of the heating portion is detected.

DESCRIPTION OF EMBODIMENTS

A. First Embodiment

A1. System Configuration

Figure 1:
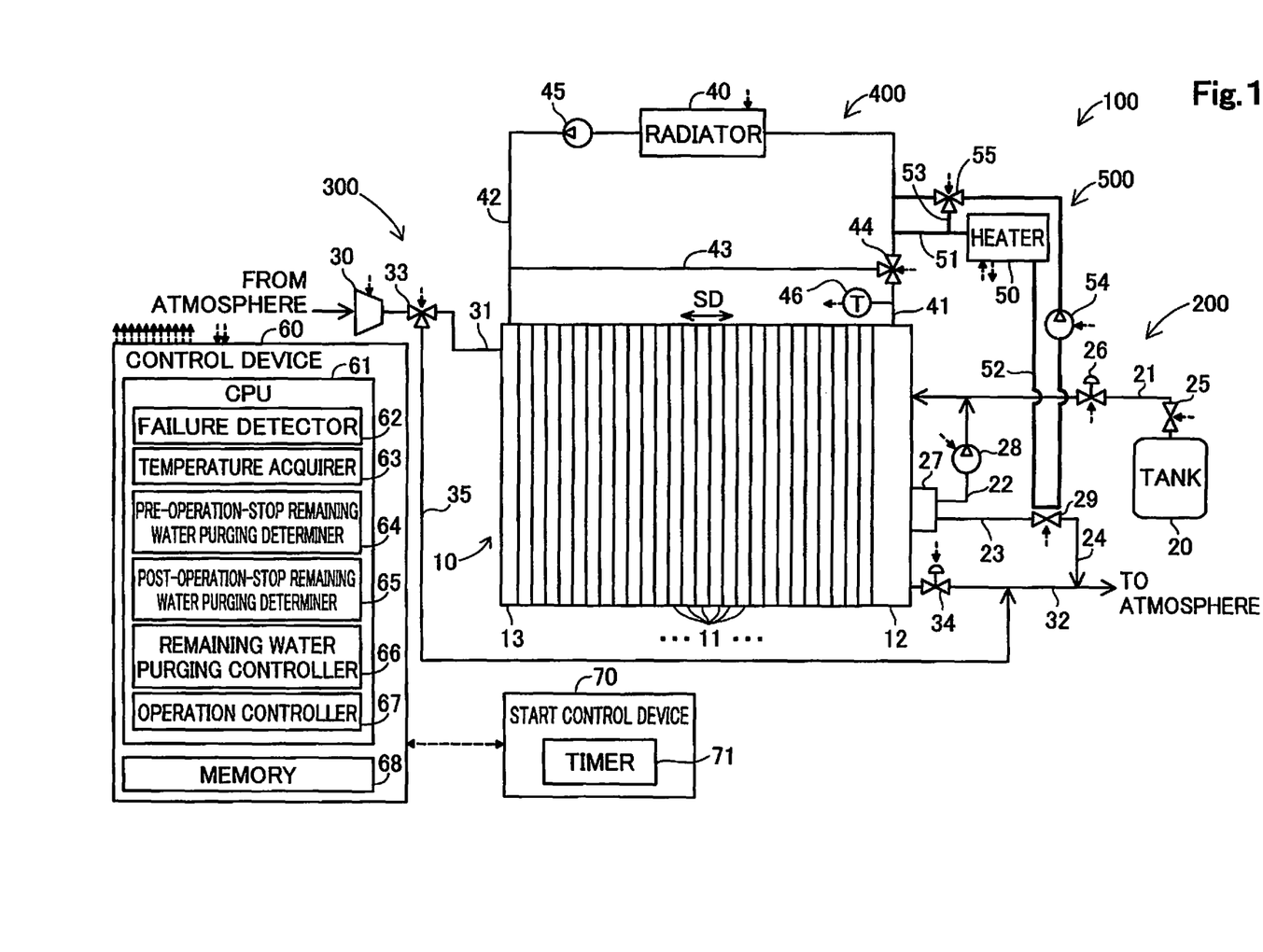
FIG. 1 is a block diagram illustrating the schematic configuration of a fuel cell system according to one embodiment of the present disclosure.

FIG. 1 is a block diagram illustrating the schematic configuration of a fuel cell system 100 according to one embodiment of the present disclosure. The fuel cell system 100 is mounted on a vehicle to be used as a system of driving power supply. The fuel cell system 100 includes a fuel cell 10, a fuel gas supply discharge mechanism 200, an oxidizing gas supply discharge mechanism 300, a fuel cell circulation cooling mechanism 400, a heating portion 500, a control device 60 and a start control device 70.

The fuel cell 10 includes a plurality of unit cells 11 that are stacked along a stacking direction SD, and a pair of end plates 12 and 13 that are placed on respective ends in the stacking direction SD. Each of the unit cells 11 is a polymer electrolyte fuel cell and is configured to generate electric power by an electrochemical reaction of a fuel gas and an oxidizing gas that are respectively supplied to an anode-side catalyst electrode layer and a cathode-side catalyst electrode layer provided across a solid polymer electrolyte membrane. According to the embodiment, the fuel gas is hydrogen gas, and the oxidizing gas is the air. The catalyst electrode layer is configured to include an electrolyte and carbon particles with a catalyst such as platinum (Pt) supported thereon. The unit cell 11 also includes gas diffusion layers that are placed outside of the catalyst electrode layers on the respective electrode sides and that are made of a porous material. The porous material used may be, for example, a carbon porous body such as carbon paper or carbon cloth or a metal porous body such as metal mesh or foamed metal. Manifolds (not shown) which the fuel gas, the oxidizing gas and a cooling medium flow in are formed inside of the fuel cell 10 along the stacking direction SD.

The pair of end plates 12 and 13 serve to hold a layered body of the plurality of unit cells 11 placed therebetween. Out of the pair of end plates 12 and 13, the end plate 12 has a function of supplying the fuel gas, the oxidizing gas and the cooling medium to the manifolds formed inside of the fuel cell 10 and a function of providing flow paths for discharging these gases and medium. The end plate 13, on the other hand, does not have such functions. Both the end plate 12 and the end plate 13 are formed in approximately plate-like outer shapes having their thickness directions identical with the stacking direction SD.

The fuel gas supply discharge mechanism 200 is configured to supply the fuel gas to the fuel cell 10 and to discharge an anode off-gas from the fuel cell 10. The fuel gas supply discharge mechanism 200 includes a hydrogen tank 20, a shutoff valve 25, an injector 26, a gas liquid separator 27, a hydrogen pump 28, a purge valve 29, a fuel gas supply path 21, a first fuel gas discharge flow path 23, a fuel gas circulation path 22 and a second fuel gas discharge flow path 24.

The hydrogen tank 20 is configured to store high-pressure hydrogen and supply the hydrogen gas as the fuel gas through the fuel gas supply path 21 to the fuel cell 10. The shutoff valve 25 is placed in the vicinity of a fuel gas supply port of the hydrogen tank 20 and serves to change over the supply of hydrogen gas from the hydrogen tank 20 between the supply and the stop of supply. The injector 26 is placed in the fuel gas supply path 21 and serves to regulate the supply amount of the hydrogen gas to the fuel cell 10 and the pressure of the hydrogen gas. The gas liquid separator 27 serves to separate water included in the anode off-gas discharged from the fuel cell 10 and discharge the separated water to the first fuel gas discharge flow path 23 and also serves to discharge the gas after the separation of water, i.e., excess fuel gas, to the fuel gas circulation path 22. According to the embodiment, the gas liquid separator 27 is formed by part of the end plate 12 and a member provided to cover this part. The hydrogen pump 28 is placed in the fuel gas circulation path 22 and serves to supply the excess fuel gas discharged from the gas liquid separator 27, through the fuel gas supply path 21 to the fuel cell 10.

The purge valve 29 is provided at a boundary between the first fuel gas discharge flow path 23 and the second fuel gas discharge flow path 24. The purge valve 29 is opened to release the water separated by the gas liquid separator 27, to the atmosphere. When the purge valve 29 is opened, part of the anode off-gas discharged from the fuel cell 10, i.e., the remaining gas that is not supplied to the fuel gas circulation path 22, is released, as well as the water. According to the embodiment, the purge valve 29 is opened and closed at predetermined time intervals during operation of the fuel cell 10. During a remaining water purging process described later, opening and closing of the purge valve 29 is performed at timings and for a time period that are determined in response to an instruction from the control device 60. The gas liquid separator 27 described above communicates with the fuel cell 10, and also communicates with the atmosphere via the second fuel gas discharge flow path 24 when the purge valve 29 is opened. The internal pressure of the fuel cell 10 is higher than the atmospheric pressure. When the purge valve 29 is opened, water accumulated in the gas liquid separator 27 is discharged to the second fuel gas discharge flow path 24 by a pressure difference between the internal pressure of the fuel cell 10 and the atmospheric pressure.

The fuel gas supply path 21 is arranged to connect the hydrogen tank 20 with the fuel cell 10 and to supply the hydrogen gas stored in the hydrogen tank 20 and the excess hydrogen gas fed by the hydrogen pump 28, to the fuel cell 10. The first fuel gas discharge flow path 23 is arranged to connect the gas liquid separator 27 with the purge valve 29 and to lead the water separated by the gas liquid separator 27 and the part of the anode off-gas to the purge valve 29. The second fuel gas discharge flow path 24 is arranged to connect the purge valve 29 with an oxidizing gas discharge flow path 32 (described later) and to lead the water and the anode off-gas led to the purge valve 29, to the oxidizing gas discharge flow path 32. The fuel gas circulation path 22 is arranged to connect the gas liquid separator 27 with the fuel gas supply path 21 and to supply the excess hydrogen gas discharged from the gas liquid separator 27 to the fuel gas supply path 21.

The oxidizing gas supply discharge mechanism 300 is configured to supply the oxidizing gas to the fuel cell 10 and to discharge a cathode off-gas from the fuel cell 10. The oxidizing gas supply discharge mechanism 300 includes an air compressor 30, an oxidizing gas supply flow path 31, an oxidizing gas discharge flow path 32, a three-way valve 33, a back pressure valve 34 and a bypass flow path 35.

The air compressor 30 is configured to supply the air as the oxidizing gas to the fuel cell 10. The oxidizing gas supply flow path 31 is arranged to connect the air compressor 30 with the fuel cell 10 and to lead the compressed air discharged from the air compressor 30, to the fuel cell 10. The oxidizing gas discharge flow path 32 is connected with a cathode-side exhaust manifold (not shown) provided inside of the fuel cell 10 to lead the cathode off-gas and water discharged from the fuel cell 10, to the atmosphere. As described above, the oxidizing gas discharge flow path 32 is connected with the second fuel gas discharge flow path 24, such that the anode off-gas and the water discharged from the second fuel gas discharge flow path 24 are led, along with the cathode off-gas and the water, to the atmosphere. The three-way valve 33 is placed in the oxidizing gas supply flow path 31 and is configured to regulate the amount of the air that is to be supplied to the oxidizing gas supply flow path 31 and the amount of the air that is to be supplied to the bypass flow path 35, out of the total amount of the air supplied from the air compressor 30. The back pressure valve 34 is placed in the vicinity of the fuel cell 10 in the oxidizing gas discharge flow path 32 and is configured to regulate a back pressure that is a pressure on a cathode discharge side of the fuel cell 10 and thereby adjust a cathode-side pressure in each of the unit cells 11. The bypass flow path 35 has one end that is connected with the three-way valve 33 and the other end that is connected with the oxidizing gas discharge flow path 32, such that the oxidizing gas supplied from the air compressor 30 via the three-way valve 33 is led to the oxidizing gas discharge flow path 32 without being supplied to the fuel cell 10.

The fuel cell circulation cooling mechanism 400 is configured to circulate cooling water through the fuel cell 10 and thereby regulate the temperature of the fuel cell 10 (hereinafter may be referred to as "fuel cell temperature"). According to the embodiment, an antifreezing liquid such as ethylene glycol is used as the cooling water. The cooling medium is, however, not limited to the antifreezing liquid but may be any heat-exchangeable medium like a gaseous medium such as the air. The fuel cell circulation cooling mechanism 400 includes a cooling water discharge flow path 41, a cooling water supply flow path 42, a bypass flow path 43, a cooling water pump 45, a radiator 40, a three-way valve 44 and a temperature sensor 46.

The cooling water discharge flow path 41 has one end that is connected with the fuel cell 10 and the other end that is connected with the radiator 40, such that the cooling water discharged from the fuel cell 10 is supplied to the radiator 40. The cooling water supply flow path 42 has one end that is connected with the radiator 40 and the other end that is connected with the fuel cell 10, such that the cooling water discharged from the radiator 40 is supplied to the fuel cell 10. The bypass flow path 43 is a flow path arranged to cause the cooling water discharged from the fuel cell 10 to be returned to the fuel cell 10 without passing through the radiator 40 and the heating portion 500. The radiator 40 includes a fan (not shown) and is configured to perform heat exchange between the outside air and the cooling water discharged from the fuel cell 10 and the cooling water discharged from the heating portion 500. The three-way valve 44 is placed in the middle of the cooling water discharge flow path 41 and is configured to adjust the amount of the cooling water that is to be supplied to the cooling water discharge flow path 41 and the amount of the cooling water that is to be supplied to the bypass flow path 43, out of the total amount of the cooling water discharged from the fuel cell 10. The temperature sensor 46 is placed in the vicinity of the fuel cell 10 in the cooling water discharge flow path 41 and is configured to measure the temperature of the cooling water in the cooling water discharge flow path 41 and notify the control device 60 of information indicating the measured temperature. According to the embodiment, the temperature of the cooling water measured by the temperature sensor 46 is used as the fuel cell temperature.

The heating portion 500 serves to heat the purge valve 29. According to the embodiment, the heating portion 500 is configured by utilizing part of an air conditioning mechanism that is used in the vehicle with the fuel cell system 100 mounted thereon. The heating portion 500 includes a cooling water inflow path 51, a heater 50, a cooling water discharge flow path 52, a bypass flow path 53, a cooling water pump 54 and a three-way valve 55.

The cooling water inflow path 51 has one end that is connected with the cooling water supply flow path 42 of the fuel cell circulation cooling mechanism 400 described above and the other end that is connected with the heater 50, such that the cooling water flowing in the cooling water supply flow path 42 is led to the heater 50. The heater 50 is configured to heat the inflow cooling water and discharged the heated cooling water. The heater 50 supplies the heated cooling water to a heater core for air conditioning (not shown), while discharging the heated cooling water to the cooling water discharge flow path 52. The heater 50 includes a heater unit and a control unit configured to control the heater unit. The cooling water discharge flow path 52 has one end that is connected with the heater 50 and the other end that is connected with the cooling water supply flow path 42, such that the cooling water heated by the heater 50 is returned to the cooling water supply flow path 42. As shown in FIG. 1, part of the cooling water discharge flow path 52 is placed in the vicinity of the purge valve 29. Accordingly, the purge valve 29 is heated by the flow of the heated cooling water in the cooling water discharge flow path 52. The cooling water pump 54 is placed in the cooling water discharge flow path 52 and is configured to regulate the flow rate of the cooling water flowing in the heating portion 500. The three-way valve 55 is placed in the middle of the cooling water discharge flow path 52 and is configured to adjust the amount of the cooling water that is to be supplied to the heater 50 and the amount of the cooling water that is to be supplied to the bypass flow path 53, out of the cooling water flowing from the cooling water discharge flow path 41 to the cooling water inflow path 51.

The control device 60 is configured to control the entire fuel cell system 100. The control device 60 includes a CPU 61 and a memory 68. The CPU 61 performs a control program stored in advance in the memory 68, such as to serve as a failure detector 62, a temperature acquirer 63, a post-operation-stop remaining water purging determiner 64, a post-operation-stop remaining water purging determiner 65, a remaining water purging controller 66 and an operation controller 67.

The failure detector 62 detects a failure of the heating portion 500. Expected failures of the heating portion 500 include, for example, a failure of the heater 50 and a failure of the cooling water pump 54. The failure detector 62 requests the heater 50 and the cooling water pump 54 to send status information and determines the occurrence or non-occurrence of a failure of the heating portion 500, based on the status information sent from the heater 50 and the cooling water pump 54 in response to the request.

The temperature acquirer 63 obtains the temperature of the purge valve 29. More specifically, the temperature acquirer 63 uses the fuel cell temperature sent from the temperature sensor 46 to estimate and obtain the temperature of the purge valve 29. The temperature of the purge valve 29 may be estimated by, for example, referring to a table that is provided in advance by an experiment that identifies a correlation of the fuel cell temperature to the temperature of the purge valve 29.

The pre-operation-stop remaining water purging determiner 64 determines whether a pre-operation-stop enhanced remaining water purging process described later is to be performed or not, prior to a stop of operation of the fuel cell 10 or more precisely at a start of an operation stop process. The post-operation-stop remaining water purging determiner 65 determines whether a post-operation-stop remaining water purging process described later is to be performed or not, after a stop of operation of the fuel cell 10. According to the embodiment, the determination of whether the pre-operation-stop enhanced remaining water purging process is to be performed or not is based on determination of whether the heating portion 500 has a failure. More specifically, the pre-operation-stop remaining water purging determiner 64 determines that the pre-operation-stop enhanced remaining water purging process is to be performed when the heating portion 500 has a failure, while determining that the pre-operation-stop enhanced remaining water purging process is not to be performed when the heating portion 500 has no failure. According to the embodiment, the determination of whether the post-operation-stop remaining water purging process is to be performed or not is based on determination of whether the temperature of the purge valve 29 is higher than 0° C. More specifically, the post-operation-stop remaining water purging determiner 65 determines that the post-operation-stop remaining water purging process is to be performed when the temperature of the purge valve 29 is higher than 0° C., while determining that the post-operation-stop remaining water purging process is not to be performed when the temperature of the purge valve 29 is equal to or lower than 0° C. The pre-operation-stop enhanced remaining water purging process and the post-operation-stop remaining water purging process may be collectively called "remaining water purging process".

The remaining water purging controller 66 controls the remaining water purging process. According to the embodiment, the remaining water purging process (i.e., the pre-operation-stop enhanced remaining water purging process and the post-operation-stop remaining water purging process) includes a cathode-side purging process and an anode-side purging process. In the cathode-side purging process, the remaining water purging controller 66 drives the air compressor 30 to supply the oxidizing gas to the fuel cell 10 and thereby discharge the cathode off-gas and the water remaining in the fuel cell 10. In the anode-side purging process, the remaining water purging controller 66 drives the hydrogen pump 28 to supply the hydrogen gas discharged from the gas liquid separator 27 to the fuel cell 10 and thereby discharge the anode off-gas and the water remaining in the fuel cell 10. The remaining water purging controller 66 controls the purge valve 29 to open and thereby causes the anode off-gas and the water discharged from the fuel cell 10 to be released to the atmosphere through the second fuel gas discharge flow path 24 and the oxidizing gas discharge flow path 32.

The operation controller 67 controls the respective functional portions 62 to 66 described above and controls actuation and stop of the respective components, such as the air compressor 30 and the hydrogen pump 28, that are electrically connected with the control device 60, so as to control the operations of the fuel cell 10 and the control device 60.

The control device 60 and the auxiliary machines including the air compressor 30 and the hydrogen pump 28 are driven by the power supply from a secondary battery (not shown). This secondary battery stores the electric power generated by the operation of the fuel cell 10. When the power level output from the fuel cell 10 is low, electric power is additionally output from this secondary battery The start control device 70 is configured to control the power supply to the control device 60 and thereby change over the power supply of the control device 60 between on and off. The start control device 70 includes a timer 71. The start control device 70 starts the power supply to the control device 60 on a timer expiration and thereby changes over the state of the control device 60 from the power off state to the power on state at a predetermined timing. The timer 71 is started by the control device 60 in the remaining water purging process described later. According to the embodiment, the start control device 70 is configured by an ASIC (application specific integrated circuit). Like the control device 60, however, the start control device 70 may be configured from a CPU and a memory, instead of the ASIC.

The fuel cell system 100 having the above configuration performs the remaining water purging process described below. This reduces the amount of the remaining water in the fuel cell 10, while suppressing the water discharged from the fuel cell 10 from being frozen in the purge valve 29.

The first fuel gas discharge flow path 23 and the second fuel gas discharge flow path 24 described above correspond to the subordinate concept of the discharge flow path described in Summary. The purge valve 29 corresponds to the subordinate concept of the valve described in Summary, and the hydrogen pump 28 corresponds to the subordinate concept of the pump described in Summary.

A2. Remaining Water Purging Process

Figure 2:
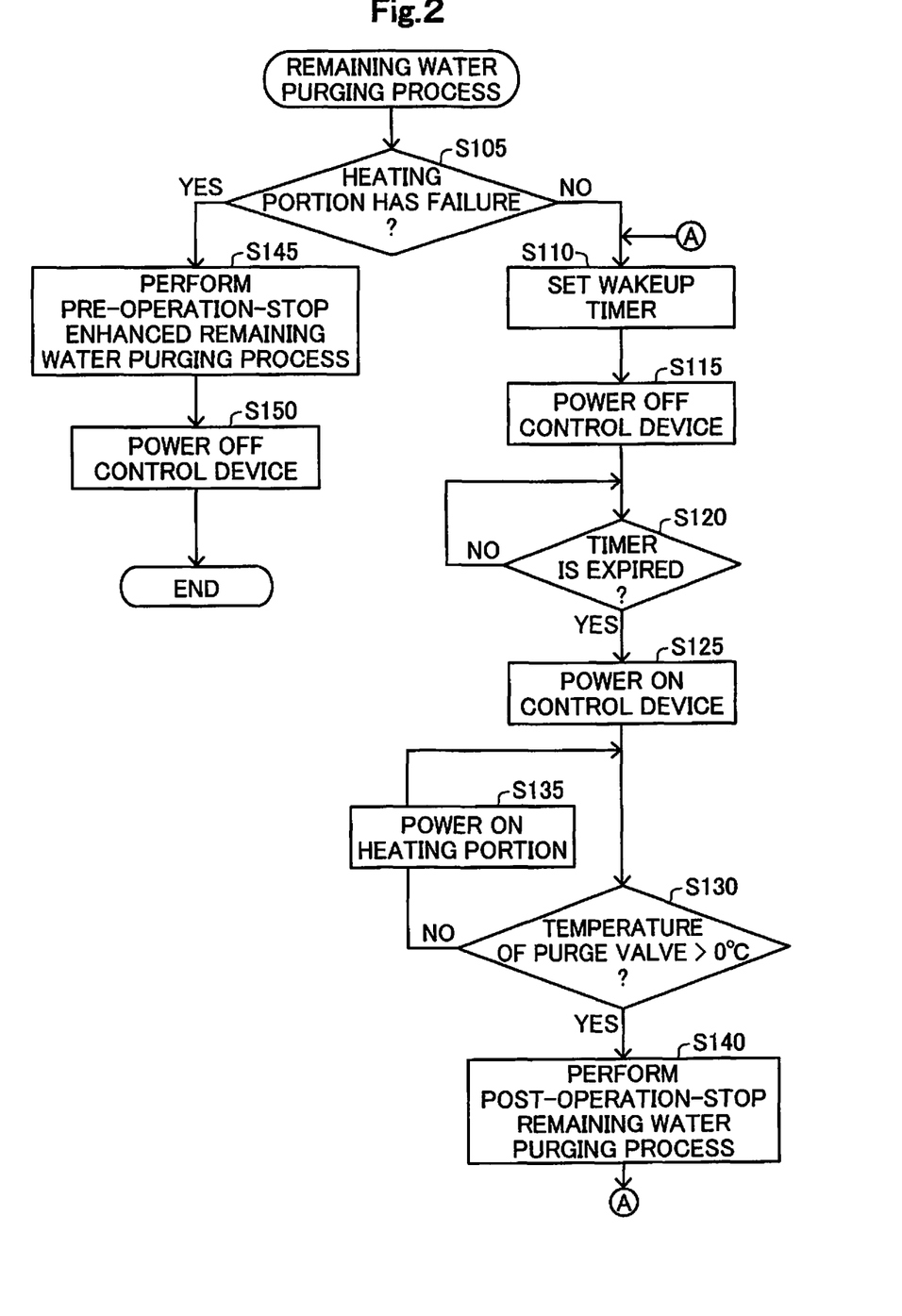
FIG. 2 is a flowchart showing a procedure of remaining water purging process performed in the fuel cell system.

FIG. 2 is a flowchart showing a procedure of remaining water purging process performed in the fuel cell system 100. The fuel cell system 100 performs the remaining water purging process when a signal indicating a changeover of an ignition from on to off is sent from an ECU (electronic control unit) of the vehicle and is received by the control device 60.

The failure detector 62 determines whether the heating portion 500 has a failure (step S105). When it is determined that the heating portion 500 has no failure (step S105: NO), the operation controller 67 sets a wakeup timer (step S110). As described later, in the fuel cell system 100, after a power-off of the control device 60, the control device 60 is powered on and off at regular intervals. Setting the wakeup timer means that a time period from a power-off to a power-on of the control device 60 is counted by the timer 71. At step S110, counting this time period is started. According to the embodiment, one hour is set as the time period from a power-off to a power-on of the control device 60. This time period is, however, not limited to one hour, but any arbitrary time may be set as this time period.

The operation controller 67 subsequently powers off the control device 60 (step S115). The operation controller 67 powers off the control object devices, such as the air compressor 30 and the hydrogen pump 28, before powering off the control device 60, although not being illustrated. The start control device 70 waits until the wakeup timer is expired (step S120). When the wakeup timer is expired (step S120: YES), the start control device 70 starts the power supply to the control device 60 to power on the control device 60 (step S125). The power supply is also started to the functional components to purge the anode side, such as the temperature sensor 46, the hydrogen pump 28 and the purge valve 29 and to the functional components to purge the cathode side, such as the air compressor 30.

The post-operation-stop remaining water purging determiner 65 subsequently determines whether the temperature of the purge valve 29 is higher than 0° C. (step S130). The temperature of the purge valve 29 is obtained by the temperature acquirer 63. When it is determined that the temperature of the purge valve 29 is equal to or lower than 0° C. (step S130: NO), the post-operation-stop remaining water purging determiner 65 determines that the post-operation-stop remaining water purging process is not to be performed. The operation controller 67 then powers on the heating portion 500 or more specifically powers on the heater 50 and the cooling water pump 54 (step S135). After the processing of step S135, the processing of step S130 described above is performed again. When the heating portion 500 is powered on, the cooling water heated by the heater 50 flows through the cooling water discharge flow path 52, so as to heat the purge valve 29 and raise the temperature of the purge valve 29. In this process, the three-way valve 55 may be controlled to stop circulation of the cooling water between the heating portion 500 and the cooling water discharge flow path 41.

When it is determined that the temperature of the purge valve 29 is higher than 0° C. (step S130: YES), the post-operation-stop remaining water purging determiner 65 determines that the post-operation-stop remaining water purging process is to be performed. The remaining water purging controller 66 then performs the post-operation-stop remaining water purging process (step S140). The detailed procedure of the post-operation-stop remaining water purging process is identical with the detailed procedure of the remaining water purging process described above and is thus not described here. A water discharge power on the anode side in the post-operation-stop remaining water purging process is smaller than the water discharge power on the anode side in the pre-operation-stop enhanced remaining water purging process as described later. According to the embodiment, the water discharge power denotes a power correlated to the amount of water dischargeable per unit time.. Accordingly, the greater water discharge power provides the larger amount of water dischargeable per unit time. When the temperature of the purge valve 29 is equal to or lower than 0° C., the purge valve 29 is heated by the heating portion 500. When the temperature of the purge valve 29 exceeds 0° C., the post-operation-stop remaining water purging process is performed. This configuration accordingly suppresses the discharged water from being frozen in the purge valve 29.

After completion of the process at step S140 described above, the remaining water purging process returns to step S100 and performs the processing of steps S110 to S140. Accordingly, the post-operation-stop remaining water purging process is performed at regular intervals.

Figure 3:
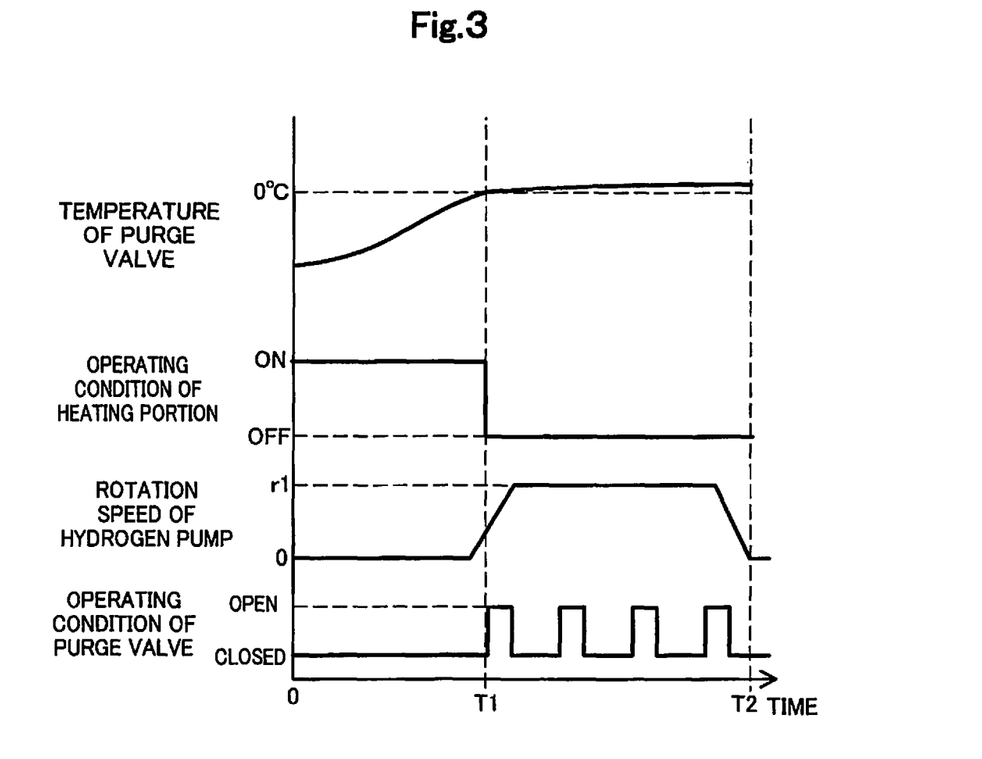
FIG. 3 is a diagram illustrating a timing chart before and after a post-operation-stop remaining water purging process.

FIG. 3 is a diagram illustrating a timing chart before and after the post-operation-stop remaining water purging process. The abscissa of FIG. 3 shows the time. A time 0 denotes a time when it is first determined at step S130 that the temperature of the purge valve 29 is equal to or lower than 0° C. as described above. A topmost graph of FIG. 3 shows a variation in temperature of the purge valve 29. A second top graph shows a variation in operating condition of the heating portion 500. A third top graph shows a variation in rotation speed of the hydrogen pump 28. A fourth top graph shows a variation in operating condition of the purge valve 29.

When it is determined at step S130 that the temperature of the purge valve 29 is equal to or lower than 0° C., the heating portion 500 is powered on as shown in the second graph. This gradually raises the temperature of the purge valve 29 as shown in the topmost graph. At a time T1 when the temperature of the purge valve 29 exceeds 0° C., the post-operation-stop remaining water purging process is performed. This powers on the hydrogen pump 28 to increase the rotation speed of the hydrogen pump 28 and starts opening and closing of the purge valve 29. The rotation speed of the hydrogen pump 28 increases to a rotation speed r1 and is then kept at the rotation speed r1. At the time T1, the heating portion 500 is powered off. The temperature of the purge valve 29 remains at the level slightly higher than 0° C. At a time T2 after elapse of a predetermined time period, the hydrogen pump 28 is stopped, and the opening and closing of the purge valve 29 is terminated.

Referring back to FIG. 2, when it is determined that the heating portion 500 has a failure (step S105: YES), the pre-operation-stop remaining water purging determiner 64 determines that the pre-operation-stop enhanced remaining water purging process is to be performed. The operation controller 67 then performs the pre-operation-stop enhanced remaining water purging process (step S145). The pre-operation-stop enhanced remaining water purging process denotes a remaining water purging process that is performed prior to an operation stop of the fuel cell 10 and that discharges the remaining water in the fuel cell 10 with the higher water discharge power than the water discharge power in the post-operation-stop remaining water purging process described above. According to the embodiment, the water discharge power is enhanced by the following methods (i) to (iv):

(i) increasing a time period when the opening and closing of the purge valve is repeatedly performed;

(ii) increasing the ratio of the open time in one open-close cycle time of the purge valve (hereinafter referred to as "duty ratio");

(iii) increasing the rotation speed of the hydrogen pump 28; and (iv) increasing a time period when the hydrogen pump 28 is driven.

The methods (i) and (ii) described above increase a total time when the purge valve 29 is open and accordingly enable a larger amount of water to be discharged. The methods (iii) and (iv) increase the amount of hydrogen gas supplied to the fuel cell 10 per unit time and accordingly enable a larger amount of water to be discharged from the fuel cell 10 by the power of the hydrogen gas.

Figure 4:
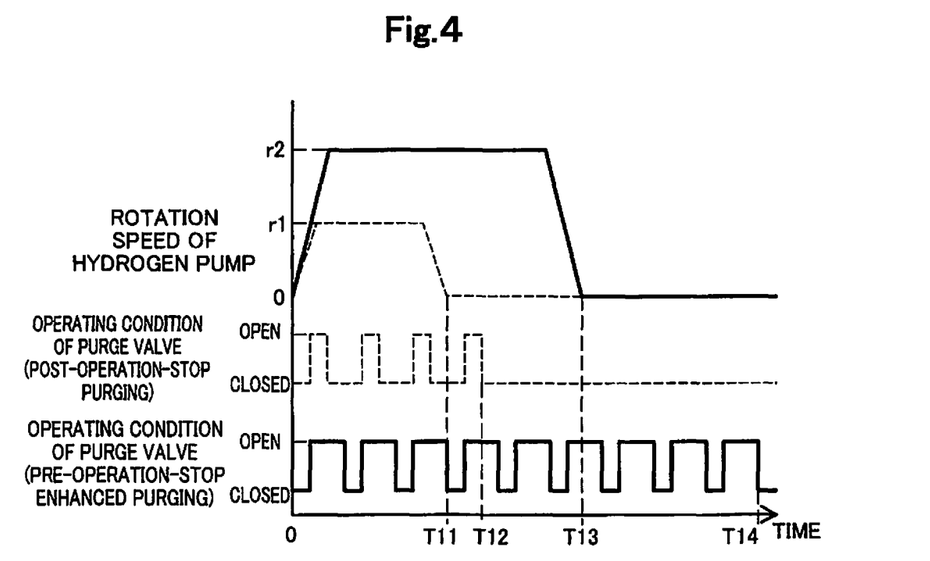
FIG. 4 is a diagram illustrating a timing chart during a pre-operation-stop enhanced remaining water purging process.

FIG. 4 is a diagram illustrating a timing chart during the pre-operation-stop enhanced remaining water purging process. The abscissa of FIG. 4 shows the time. A time 0 denotes a start time of the pre-operation-stop enhanced remaining water purging process. A topmost graph of FIG. 4 shows a variation in rotation speed of the hydrogen pump 28. A solid-line graph shows a variation in rotation speed of the hydrogen pump 28 in the pre-operation-stop enhanced remaining water purging process. For reference, a broken-line graph shows a variation in rotation speed of the hydrogen pump 28 in the post-operation-stop remaining water purging process. For reference, a second top broken-line graph of FIG. 4 shows a variation in operating condition of the purge valve 29 in the post-operation-stop remaining water purging process. A third top solid-line graph of FIG. 4 shows a variation in operating condition of the purge valve 29 in the pre-operation-stop enhanced remaining water purging process.

As shown in FIG. 4, a time period (T14) when the opening and closing of the purge valve 29 is repeatedly performed in the pre-operation-stop enhanced remaining water purging process is longer than a time period (T12) when the opening and closing of the purge valve 29 is repeatedly performed in the post-operation-stop remaining water purging process. The duty ratio of the purge valve 29 in the pre-operation-stop enhanced remaining water purging process is higher than the duty ratio of the purge valve 29 in the post-operation-stop remaining water purging process. A maximum rotation speed r2 of the hydrogen pump 28 in the pre-operation-stop enhanced remaining water purging process is higher than the maximum rotation speed r1 of the hydrogen pump 28 in the post-operation-stop remaining water purging process. Additionally, a time period (T13) when the hydrogen pump 28 is driven in the pre-operation-stop enhanced remaining water purging process is longer than a time period (T11) when the hydrogen pump 28 is driven in the post-operation-stop remaining water purging process. Such differences provide the higher water discharge power in the pre-operation-stop enhanced remaining water purging process than the water discharge power in the post-operation-stop remaining water purging process. Performing the pre-operation-stop enhanced remaining water purging process having the higher water discharge power discharges a larger amount of water remaining in the fuel cell 10.

Referring back to FIG. 2, after completion of the pre-operation-stop enhanced remaining water purging process, the operation controller 67 powers off the control device 60 (step S150). The processing of step S150 is identical with the processing of step S115 described above, and its detailed description is omitted. After completion of the processing of step S150, the remaining water purging process is terminated. Accordingly, when the pre-operation-stop enhanced remaining water purging process is performed, the post-operation-stop remaining water purging process is not performed. This is because the pre-operation-stop enhanced remaining water purging process has the high water discharge power to sufficiently discharge the remaining water in the fuel cell 10. There is accordingly no need to discharge water after an operation stop of the fuel cell 10.

The fuel cell system 100 of the first embodiment described above includes the heating portion 500 configured to heat the purge valve 29 and accordingly suppresses the discharged water from being frozen in the purge valve 29 in the post-operation-stop remaining water purging process. In the case of detection of a failure of the heating portion 500, the remaining water purging process is performed prior to an operation stop of the fuel cell 10 (i.e., pre-operation-stop enhanced remaining water purging process). The water discharge power in this remaining water purging process is higher than the water discharge power in the remaining water purging process performed in the case of detection of no failure of the heating portion 500 (i.e., post-operation-stop remaining water purging process). This configuration reduces the amount of water remaining in the fuel cell 10 after an operation stop of the fuel cell 10 and thereby suppresses the water from being frozen in the purge valve 29 after the operation stop of the fuel cell 10.

In the case of detection of a failure of the heating portion 500, the fuel cell system 100 of the first embodiment performs the pre-operation-stop enhanced remaining water purging process having the higher water discharge power than the water discharge power in the post-operation-stop remaining water purging process, and does not perform the post-operation-stop remaining water purging process. This configuration reduces the amount of water remaining in the fuel cell 10 after an operation stop of the fuel cell 10 and suppresses the discharged water from being frozen in the purge valve 29, compared with a configuration that performs the remaining water purging process in a low temperature condition after an operation stop of a fuel cell. In the case of detection of no failure of the heating portion 500, the fuel cell system 100 of the first embodiment performs the post-operation-stop remaining water purging process, and does not perform the pre-operation-stop enhanced remaining water purging process. This configuration uses the heating portion 500 to suppress the discharged water from being frozen in the purge valve 29, and reduces power consumption required for the remaining water purging process, compared with a configuration that performs both the pre-operation-stop enhanced remaining water purging process and the post-operation-stop remaining water purging process.

The fuel cell system 100 of the first embodiment does not perform the post-operation-stop remaining water purging process when the temperature of the purge valve 29 is equal to or lower than 0° C., while performing the post-operation-stop remaining water purging process when the temperature of the purge valve 29 is higher than 0° C. This configuration suppresses the discharged water from being frozen in the purge valve 29 and reduces power consumption required for the remaining water purging process, compared with a configuration that performs the post-operation-stop remaining water purging process irrespective of the temperature of the purge valve 29. When the temperature of the purge valve 29 is equal to or lower than 0° C., the heating portion 500 serves to heat the purge valve 29. This raises the temperature of the purge valve 29 to be higher than 0° C.

Controlling the time period when the opening and closing of the purge valve 29 is repeatedly performed and the duty ratio in one open-close cycle time of the purge valve 29, in other words, the ratio of the open time to the close time results in controlling the water discharge power in the remaining water purging process. This configuration enables the water discharge power in the remaining water purging process to be controlled with high accuracy.

Controlling the time period when the pump is driven and the rotation speed of the pump results in controlling the water discharge power in the remaining water purging process. This configuration enables the water discharge power in the remaining water purging process to be controlled with high accuracy.

The heating portion 500 is configured by utilizing part of the air conditioning mechanism used in the vehicle with the fuel cell system 100 mounted thereon. This configuration reduces the manufacturing cost of the fuel cell system 100, compared with a configuration that provides an exclusive mechanism for heating the purge valve 29.

B. Second Embodiment

Figure 5:
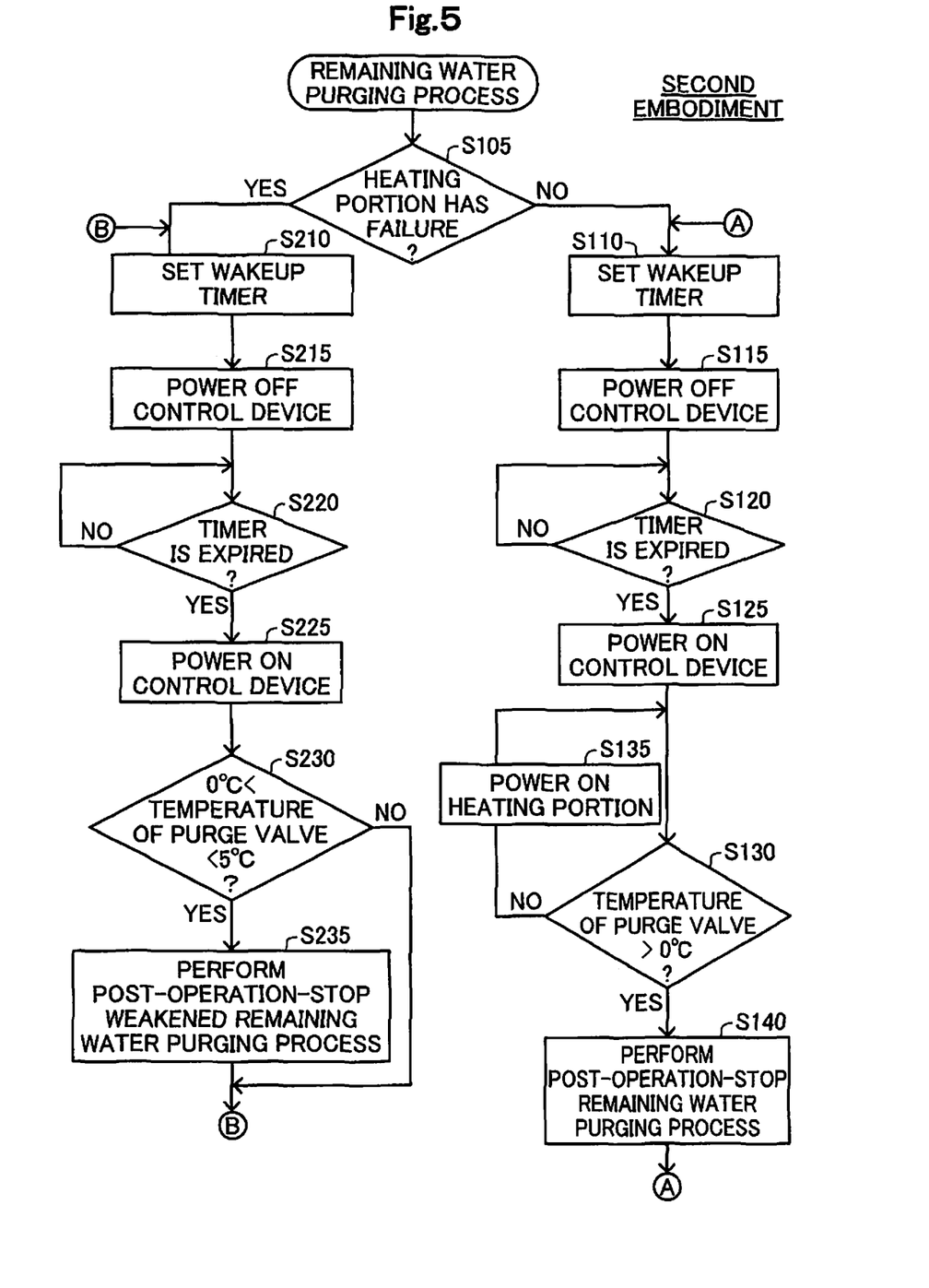
FIG. 5 is a flowchart showing a procedure of remaining water purging process according to a second embodiment.

FIG. 5 is a flowchart showing a procedure of remaining water purging process according to a second embodiment. The configuration of a fuel cell system of the second embodiment is identical with the configuration of the fuel cell system 100 of the first embodiment shown in FIG. 1. The like components are expressed by the like reference signs, and their detailed description is omitted.

The remaining water purging process of the second embodiment differs from the remaining water purging process of the first embodiment shown in FIG. 2 by the processing of steps S210 to S235 performed in place of the processing of steps S145 and S150. Otherwise the procedure of the remaining water purging process of the second embodiment is identical with the procedure of the remaining water purging process of the first embodiment. The like steps are shown by the like step numbers, and their detailed description is omitted.

When it is determined that the heating portion 500 has a failure (step S105: YES), the processing of steps S210 to S225 is performed. The processing of step S210 is identical with the processing of step S110 described above. The processing of step S215, the processing of step S220, and the processing of step S225 are respectively identical with the processing of step S115, the processing of step S120 and the processing of step S125 described above, and their detailed description is omitted.

After completion of the processing at step S225, i.e., after the control device 60 is powered on, the post-operation-stop remaining water purging determiner 65 determines whether the temperature of the purge valve 29 is higher than 0° C. and is lower than 5° C. (step S230). When it is determined that the temperature of the purge valve 29 is higher than 0° C. and lower than 5° C. (step S230: YES), the operation controller 67 performs a post-operation-stop weakened remaining water purging process (step S235). The post-operation-stop weakened remaining water purging process denotes a remaining water purging process that is performed after an operation stop of the fuel cell 10 and that has a lower water discharge power than the water discharge power in the post-operation-stop remaining water purging process described above to discharge the remaining water in the fuel cell 10. According to the embodiment, the water discharge power is lowered by shortening the time period when the opening and closing of the purge valve 29 is repeatedly performed and the time period when the hydrogen pump 28 is driven. The water discharge power may be lowered by reducing at least one of the duty ratio and the rotation speed of the hydrogen pump 28, in place of or in addition to by shortening the time period when the opening and closing of the purge valve 29 is repeatedly performed and the time period when the hydrogen pump 28 is driven.

When it is determined that the temperature of the purge valve 29 is not higher than 0° C. or not lower than 5° C., i.e., when it is determined that the temperature of the purge valve 29 is equal to or lower than 0° C. or is equal to or higher than 5° C. (step S230: NO), on the other hand, the remaining water purging process skips step S235 and returns to step S210. In this case, the remaining water purging process is not performed.

The post-operation-stop weakened remaining water purging process is performed when the temperature of the purge valve 29 is higher than 0° C. and lower than 5° C. This configuration suppresses the water discharge from the fuel cell 10 from being frozen in the purge valve 29. The post-operation-stop weakened remaining water purging process has the lowered water discharge power, because of the following reason. The temperature of the purge valve 29 is more likely to be higher than 0° C. and lower than 5° C., so that the remaining water purging process (post-operationstop weakened remaining water purging process) is more likely to be performed. The fuel cell system of the second embodiment accordingly lowers the water discharge power of one remaining water purging process, thereby reducing power consumption required for one remaining water purging process and reducing an increase in total power consumption required for the remaining water purging process. Performing the remaining water purging process during a vehicle stop generates the operation noise and vibration of the hydrogen pump 28 and gives the user a feeling of strangeness. Since the temperature of the purge valve 29 is more likely to be higher than 0° C. and lower than 5° C., this may significantly give the user a feeling of strangeness. The fuel cell system of the second embodiment accordingly shortens the time period when opening and closing of the purge valve 29 is repeatedly performed and the time period when the hydrogen pump 28 is driven in each remaining water purging process, with a view to reducing the user's feeling of strangeness.

The fuel cell system of the second embodiment described above has similar advantageous effects to those of the fuel cell system 100 of the first embodiment. Additionally, in the case of a failure of the heating portion 500, the fuel cell system of the second embodiment performs the remaining water purging process when the temperature of the purge valve 29 is higher than 0° C. and lower than 5° C., for example, before the temperature of the purge valve 29 decreases to 0° C. in the state that the temperature of the purge valve 29 gradually decreases due to an operation stop of the fuel cell 10. This configuration suppresses the water discharged from the fuel cell 10 from being frozen in the purge valve 29. The fuel cell system of the second embodiment does not perform the remaining water purging process when the temperature of the purge valve 29 is higher than 5° C. This configuration suppresses the remaining water purging processing from being performed frequently and thereby reduces an increase in power consumption required for the remaining water purging process, while suppressing the user from feeling strange.

C. Modifications

C1. Modification 1

Each of the above embodiments performs the post-operation-stop remaining water purging process at substantially regular intervals when the heating portion 500 has no failure. The present disclosure is, however, not limited to this configuration. For example, the post-operation-stop remaining water purging process may be performed only once after an operation stop of the fuel cell 10. A modification may start the control device 60 at regular intervals like the above respective embodiments and may not perform the post-operation-stop remaining water purging process when the temperature of the purge valve 29 is higher than 0° C. When the temperature of the purge valve 29 is equal to or lower than 0° C., this modification may use the heating portion 500 to heat the purge valve 29 and subsequently perform the post-operation-stop remaining water purging process. This modified configuration does not perform the remaining water purging process when the temperature of the purge valve 29 is higher than 0° C. and thereby further reduces the power consumption.

C2. Modification 2

The first embodiment employs all the methods (i) to (iv) described above for the purpose of increasing the water discharge power in the pre-operation-stop enhanced remaining water purging process. At least one of these methods may be omitted. For example, a modification may perform at least one of the methods of (i) increasing the time period when the opening and closing of the purge valve is repeatedly performed and (ii) increasing the ratio of the open time in one open-close cycle time of the purge valve (hereinafter referred to as "duty ratio"), while omitting the. methods (iii) and (v). Another modification may perform at least one of the methods of (iii) increasing the rotation speed of the hydrogen pump 28 and (iv) increasing the time period when the hydrogen pump 28 is driven, while omitting the methods (i) and (ii). Furthermore, instead of the above methods (i) to (iv) or in addition to the above methods (i) to (iv), any process for increasing the water discharge power from the fuel cell 10 may be performed.

C3. Modification 3

In the respective embodiments, the heating portion 500 is configured by utilizing part of the air conditioning mechanism used in the vehicle with the fuel cell system 100 mounted thereon. The present disclosure is, however, not limited to this configuration. For example, an exclusive heater for heating the purge valve 29 may be placed in the vicinity of the purge valve 29.

C4. Modification 4

The second embodiment determines whether the temperature of the purge valve 29 is higher than 0° C. and lower than 5° C. at step S230 in the remaining water purging process. The present disclosure is, however, not limited to this configuration. The upper limit temperature of this determination is not limited to 5° C. but may be any temperature close to 0° C. A modification may estimate the temperature of the purge valve 29 at a next wakeup time and determine whether the estimated temperature is within a predetermined temperature range, instead of determining whether the current temperature of the purge valve 29 is within a predetermined temperature range at step S230. The temperature of the purge valve 29 at the next wakeup time may be estimated by, for example, using at least one information among a variation in the temperature of the purge valve 29, the ambient temperature, a variation in the ambient temperature, the fuel cell temperature and a variation in the fuel cell temperature.

C5. Modification 5

In the respective embodiments, the temperature acquirer 63 is configured to estimate the temperature of the purge valve 29 by using the fuel cell temperature sent from the temperature sensor 46. The present disclosure is, however, not limited to this configuration. For example, a temperature sensor configured to directly measure the temperature of the purge valve 29 may be provided additionally, and the temperature acquirer 63 may obtain temperature information from this additional temperature sensor. Another modification may notify a device other than the control device 60, for example, the ECU mounted on the vehicle, of the fuel cell temperature measured by the temperature sensor 46 and may receive and obtain the temperature of the purge valve 29 that is estimated based on the received fuel cell temperature by the ECU.

C6. Modification 6

In the respective embodiments, the fuel cell system 100 is mounted on the vehicle to be used as the system of driving power supply. The present disclosure is, however, not limited to this configuration. The fuel cell system 100 may be mounted and used on any other moving body that requires the driving power supply, for example, a ship or an airplane, instead of the motor vehicle. The fuel cell system 100 may also be placed indoors or outdoors at an office or at home to be used as a stationary power supply. Each of the unit cells 11 included in the fuel cell 10 is the unit cell for the polymer electrolyte fuel cell in the above embodiments but may be a unit cell for any of various other fuel cells, for example, a phosphorous acid fuel cell, a molten carbonate fuel cell or a solid oxide fuel cell.

C7. Modification 7

The configuration of the fuel cell system 100 of each embodiment is only illustrative and may be modified in various ways. For example, the oxidizing gas discharge flow path 32 and the second fuel gas discharge flow path 24 may not be connected with each other but may be configured to independently discharge the respective off-gases. In another example, the start control device 70 may be configured to have the respective functional components 62 to 67, instead of the control device 60.

C8. Modification 8

In the above embodiments, part of the configuration implemented by the hardware may be replaced by the software configuration, while part of the configuration implemented by the software may be replaced by the hardware configuration. For example, at least one functional component among the respective functional components 62 to 67 may be implemented by an integrated circuit, a discrete circuit or a combination thereof. When part or the entirety of a certain function in the present disclosure is implemented by the software configuration, the software (computer program) may be provided in the form of storage in a computer readable recording medium. The term "computer readable recording medium" is not limited to portable recording media such as flexible disks and CD-ROMs but includes internal storage devices such as various RAMs and ROMs included in the computer, as well as external storage devices such as hard disks fixed to the computer. Accordingly, the term "computer readable recording medium" is used in a wider sense including any recording medium that is capable of storing data packets in a non-transitory manner.

The disclosure is not limited to any of the embodiments and the modifications described above but may be implemented by a diversity of other configurations without departing from the scope of the disclosure. For example, the technical features of any of the embodiments and the modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the present disclosure, there is provided a fuel cell system. The fuel cell system comprises a fuel cell; a reactive gas supply mechanism configured to supply a reactive gas to the fuel cell; a discharge flow path configured to discharge an off-gas and water discharged from the fuel cell; a valve provided in the discharge flow path; a remaining water purging controller configured to control a remaining water purging process of the fuel cell by using the reactive gas supply mechanism and the valve; a heating portion configured to heat the valve; and a failure detector configured to detect a failure of the heating portion. When a failure of the heating portion is detected, the remaining water purging controller performs the remaining water purging process and increases a water discharge power in the remaining water purging process than a water discharge power in the remaining water purging process performed when no failure of the heating portion is detected.

The fuel cell system of this aspect includes the heating portion configured to heat the valve. This configuration suppresses the discharged water from being frozen in the valve in the remaining water purging process. When a failure of the heating portion is detected, the fuel cell system of this aspect performs the remaining water purging process prior to an operation stop of the fuel cell and increases the water discharge power in the remaining water purging process than the water discharge power in the remaining water purging process performed when no failure of the heating portion is detected. This configuration reduces the amount of remaining water in the fuel cell after an operation stop of the fuel cell and suppresses water from being frozen in the valve after the operation stop of the fuel cell.

(2) In the fuel cell system of the above aspect, the remaining water purging controller may control a pre-operation-stop remaining water purging process that is executable prior to an operation stop of the fuel cell and a post-operation-stop remaining water purging process that is executable after the operation stop of the fuel cell, as the remaining water purging process. When a failure of the heating portion is detected, the remaining water purging controller may perform the pre-operation-stop remaining water purging process with a higher water discharge power than a water discharge power in the post-operation-stop remaining water purging process, and does not perform the post-operation-stop remaining water purging process. When no failure of the heating portion is detected, the remaining water purging controller performs the post-operation-stop remaining water purging process, and does not perform the pre-operation-stop remaining water purging process. When a failure of the heating portion is detected, the fuel cell system of this aspect performs the pre-operation-stop remaining water purging process with the higher water discharge power than the water discharge power in the post-operation-stop remaining water purging process, and does not perform the post-operation-stop remaining water purging process. This configuration reduces the amount of remaining water in the fuel cell after an operation stop of the fuel cell and suppresses the discharged water from being frozen in the valve, compared with a configuration that performs the remaining water purging process in a low temperature condition after the operation stop of the fuel cell. When no failure of the heating portion is detected, the fuel cell system of this aspect performs the post-operation-stop remaining water purging process and does not perform the pre-operation-stop remaining water purging process. This configuration uses the heating portion to suppress the discharged water from being frozen in the valve and reduces power consumption required for the remaining water purging process, compared with a configuration that performs both the pre-operation-stop remaining water purging process and the post-operation-stop remaining water purging process.

(3) The fuel cell system of the above aspect may further comprise a temperature acquirer configured to obtain temperature of the valve. The remaining water purging controller may be activated at regular intervals after an operation stop of the fuel cell to check the temperature of the valve obtained by the temperature acquirer and to perform the post-operation-stop remaining water purging process when the temperature is higher than 0° C., while not performing the post-operation-stop remaining water purging process when the temperature is equal to or lower than 0° C. The heating portion may heat the valve when the temperature of the valve obtained by the temperature acquirer is equal to or lower than 0° C. The fuel cell system of this aspect performs the post-operation-stop remaining water purging process when the obtained temperature of the valve is equal to or higher than 0° C., while not performing the post-operation-stop remaining water purging process when the obtained temperature of the valve is lower than 0° C. This configuration suppresses the discharged water from being frozen in the valve and reduces power consumption required for the remaining water purging process, compared with a configuration that performs the post-operation-stop remaining water purging process irrespective of the temperature of the valve. When the temperature of the valve is lower than 0° C., the heating portion serves to heat the valve. This raises the temperature of the valve to be higher than 0° C.

(4) In the fuel cell system of the above aspect, the remaining water purging controller may cause the valve to repeatedly perform opening and closing in the remaining water purging process and controls a water discharge power in the remaining water purging process by controlling at least one of a time period when opening and closing of the valve is repeatedly performed and a ratio of an open time to a close time in one open-close cycle of the valve. The fuel cell system of this aspect controls the water discharge power in the remaining water purging process by controlling at least one of the time period when opening and closing of the valve is repeatedly performed and the ratio of the open time to the close time in one open-close cycle of the valve. This configuration enables the water discharge power in the remaining water purging process to be controlled with high accuracy.

(5) In the fuel cell system of the above aspect, the reactive gas supply mechanism may include a pump configured to supply an excess of the reactive gas included in the off-gas to the fuel cell. The remaining water purging controller may drive the pump in the remaining water purging process and controls a water discharge power in the remaining water purging process by controlling at least one of a time period when the pump is driven and a rotation speed of the pump. The fuel cell system of this aspect controls the water discharge power in the remaining water purging process by controlling at least one of the time period when the pump is driven and the rotation speed of the pump. This configuration enables the water discharge power in the remaining water purging process to be controlled with high accuracy.

The present disclosure may be implemented by various aspects, for example, a control device configured to control a remaining water purging process of a fuel cell, a remaining water purging control method of controlling a remaining water purging process of a fuel cell, a computer program configured to implement such a method, and a storage medium in which such a computer program is stored.

What is claimed is:

1. A fuel cell system, comprising:
   a fuel cell;
   a reactive gas supply mechanism configured to supply a reactive gas to the fuel cell;
   a discharge flow path configured to discharge an off-gas and water discharged from the fuel cell;
   a valve provided in the discharge flow path;
   a remaining water purging controller configured to control a remaining water purging process of the fuel cell by using the reactive gas supply mechanism and the valve;
   a heating portion configured to heat the valve; and
   a failure detector configured to detect a failure of the heating portion, wherein
   when a failure of the heating portion is detected, the remaining water purging controller performs the remaining water purging process and increases a water discharge power in the remaining water purging process than the water discharge power in the remaining water purging process performed when no failure of the heating portion is detected.

2. The fuel cell system according to claim 1,
   wherein the remaining water purging controller controls a pre-operation-stop remaining water purging process that is executable prior to an operation stop of the fuel cell and a post-operation-stop remaining water purging process that is executable after the operation stop of the fuel cell, as the remaining water purging process, wherein
   when a failure of the heating portion is detected, the remaining water purging controller performs the pre-operation-stop remaining water purging process with a higher water discharge power than a water discharge power in the post-operation-stop remaining water purging process, and does not perform the post-operation-stop remaining water purging process, and
   when no failure of the heating portion is detected, the remaining water purging controller performs the post-operation-stop remaining water purging process, and does not perform the pre-operation-stop remaining water purging process.

3. The fuel cell system according to claim 2, further comprising:
   a temperature acquirer configured to obtain temperature of the valve, wherein
   the remaining water purging controller is activated at regular intervals after an operation stop of the fuel cell to check the temperature of the valve obtained by the temperature acquirer and to perform the post-operation-stop remaining water purging process when the temperature is higher than 0° C., while not performing the post-operation-stop remaining water purging process when the temperature is equal to or lower than 0° C., and
   the heating portion heats the valve when the temperature of the valve obtained by the temperature acquirer is equal to or lower than 0° C.

4. The fuel cell system according to claim 1,
   wherein the remaining water purging controller causes the valve to repeatedly perform opening and closing in the remaining water purging process and controls a water discharge power in the remaining water purging process by controlling at least one of a time period when opening and closing of the valve is repeatedly performed and a ratio of an open time to a close time in one open-close cycle of the valve.

5. The fuel cell system according to claim 1,
   wherein the reactive gas supply mechanism includes a pump configured to supply an excess of the reactive gas included in the off-gas to the fuel cell, wherein
   the remaining water purging controller drives the pump in the remaining water purging process and controls the water discharge power in the remaining water purging process by controlling at least one of a time period when the pump is driven and a rotation speed of the pump.

6. A remaining water purging control method of controlling a remaining water purging process of a fuel cell, comprising:
   detecting a failure of a valve that is provided in a discharge flow path configured to discharge an off-gas and water discharged from the fuel cell;
   detecting a failure of a heating portion that is configured to heat the valve; and
   performing the remaining water purging process by utilizing the valve and a reactive gas supply mechanism configured to supply a reactive gas to the fuel cell, when a failure of the heating portion is detected, wherein the performing the remaining water purging process comprises increasing a water discharge power in the remaining water purging process than the water discharge power in the remaining water purging process performed when no failure of the heating portion is detected.

* * * * *